(12) United States Patent
Nozawa et al.

(10) Patent No.: US 12,444,301 B2
(45) Date of Patent: Oct. 14, 2025

(54) OPERATION MANAGEMENT SYSTEM

(71) Applicants: TOYOTA JIDOSHA KABUSHIKI KAISHA, Toyota (JP); KOMATSU LTD., Tokyo (JP)

(72) Inventors: Yusuke Nozawa, Atsugi (JP); Shun Mizoo, Zama (JP); Toru Takashima, Susono (JP); Takashi Hiranaka, Tokyo (JP); Kenta Osagawa, Tokyo (JP); Shota Konishi, Tokyo (JP)

(73) Assignees: TOYOTA JIDOSHA KABUSHIKI KAISHA, Toyota (JP); KOMATSU LTD., Tokyo (JP)

( * ) Notice: Subject to any disclaimer, the term of this patent is extended or adjusted under 35 U.S.C. 154(b) by 95 days.

(21) Appl. No.: 18/606,327

(22) Filed: Mar. 15, 2024

(65) Prior Publication Data

US 2024/0321095 A1 Sep. 26, 2024

(30) Foreign Application Priority Data

Mar. 20, 2023 (JP) ................................. 2023-044432

(51) Int. Cl.
  G08G 1/0968 (2006.01)
  G08G 1/0967 (2006.01)

(52) U.S. Cl.
  CPC . G08G 1/096844 (2013.01); G08G 1/096725 (2013.01)

(58) Field of Classification Search
  CPC ............... G08G 1/096844; G08G 1/096725
  USPC ......................................................... 701/117
  See application file for complete search history.

(56) References Cited

U.S. PATENT DOCUMENTS

| 9,593,463 | B1* | 3/2017 | Hiranaka | G05D 1/02 |
| 9,595,196 | B1* | 3/2017 | Hiranaka | G08G 1/164 |
| 10,317,224 | B2* | 6/2019 | Hisano | G05D 1/0212 |
| 2020/0158519 | A1* | 5/2020 | McGavran | G07C 5/008 |
| 2022/0105926 | A1* | 4/2022 | Zhang | G08G 1/162 |
| 2022/0105953 | A1* | 4/2022 | Osagawa | B60W 40/105 |
| 2022/0258763 | A1* | 8/2022 | Nimura | G01C 21/3407 |
| 2022/0281456 | A1* | 9/2022 | Giovanardi | G06V 20/58 |

(Continued)

FOREIGN PATENT DOCUMENTS

| JP | 2020-084431 A | 6/2020 |
| JP | 2022-114191 A | 8/2022 |
| WO | 2022/004131 A1 | 1/2022 |

*Primary Examiner* — Luis A Martinez Borrero
(74) *Attorney, Agent, or Firm* — Sughrue Mion, PLLC

(57) ABSTRACT

An operation management system configured to manage operations of registered mobilities in a limited specific area, including a computer configured to: generate a road surface map data such that a position in map data and road surface information are associated with each other, based on positional information and road surface information obtained from at least one of the registered mobilities on which a road surface condition detecting device is installed; compute a positon where a puddle is formed, based on i) one of water sprinkling information that is information on water sprinkling over a road surface by a sprinkler vehicle or weather information of the specific area and ii) the road surface map data; designate a designation mobility from among the registered mobilities and modify a target route of the designation mobility based on the puddle position; and send a command regarding the modified target route to the designation mobility.

6 Claims, 2 Drawing Sheets

(56) References Cited

U.S. PATENT DOCUMENTS

| | | | | |
|---|---|---|---|---|
| 2022/0324421 | A1* | 10/2022 | Giovanardi | G08G 1/0145 |
| 2023/0205230 | A1* | 6/2023 | Osagawa | G05D 1/0223 |
| 2023/0229169 | A1 | 7/2023 | Osagawa et al. | |
| 2023/0236037 | A1* | 7/2023 | Heilbron | G08G 1/0133 |
| | | | | 701/422 |
| 2023/0256971 | A1* | 8/2023 | Buda | G08G 1/056 |
| | | | | 701/117 |
| 2024/0016138 | A1* | 1/2024 | Takeda | G05D 1/637 |
| 2024/0083429 | A1* | 3/2024 | Shimizu | G08G 1/09 |
| 2024/0134395 | A1* | 4/2024 | Maeda | G05D 1/6484 |
| 2024/0231389 | A9* | 7/2024 | Maeda | G05D 1/6484 |
| 2024/0302845 | A1* | 9/2024 | Miyashita | G06Q 10/047 |
| 2024/0317238 | A1* | 9/2024 | Miyashita | G05D 1/617 |
| 2025/0229787 | A1* | 7/2025 | Buda | G08G 1/0141 |

\* cited by examiner

OPERATION MANAGEMENT SYSTEM

REFERENCE TO RELATED APPLICATIONS

This application claims priority from Japanese Patent Application No. 2023-044432 filed on Mar. 20, 2023. The entire content of the priority application is incorporated herein by reference.

BACKGROUND ART

The present disclosure relates to an operation management system.

Japanese Patent Application Publication No. 2020-84431 discloses a road surface management system configured to output a signal for instructing execution of a soil dust suppressing work when the system determines the need for executing the soil dust suppressing work such as water sprinkling over a road surface in mines. In mines, heavy machines (work machines), light vehicles and so on travel on an unpaved road. When water sprinkling is performed over a dry unpaved road by a sprinkler vehicle, soil dust and sand dust are suppressed.

There may be a possibility that a puddle is formed after water sprinkling is performed over a road surface where a hollowed portion such as a depression is formed. The puddle makes a road surface friction coefficient small at that portion, causing a possibility of provoking skidding. Further, traveling of a mobility may be adversely influenced due to a difference in the road surface friction coefficient between a tire that passes the puddle and a tire that does not pass the puddle. If traveling of a heavy machine is disturbed, work efficiency in mines is significantly lowered.

Accordingly, one aspect of the present disclosure relates to an operation management system capable of suppressing a decrease in the work efficiency in mines.

SUMMARY

In one aspect of the present disclosure, an operation management system is configured to manage operations of a plurality of registered mobilities in a limited specific area that includes unpaved roads but does not include ordinary roads, by sending a command as to a target route and a traveling speed to each of the registered mobilities, which is capable of obtaining positional information thereof. The operation management system includes a computer configured to: generate a road surface map data such that a position in map data and road surface information are associated with each other, based on the positional information and the road surface information obtained from at least one of the registered mobilities on which a road surface condition detecting device configured to detect a road surface condition is installed; compute a positon where a puddle is formed, based on i) one of water sprinkling information that is information on water sprinkling over a road surface by a sprinkler vehicle or weather information of the specific area and ii) the road surface map data; designate a designation mobility from among the plurality of registered mobilities and modify the target route of the designation mobility based on the position of the puddle; and send a command as to the modified target route to the designation mobility.

According to the operation management system of the present disclosure, the target route of the designation mobility can be modified based on the position of the puddle. This suppresses a decrease in the work efficiency in mines.

BRIEF DESCRIPTION OF DRAWINGS

The objects, features, advantages, and technical and industrial significance of the present disclosure will be better understood by reading the following detailed description of an embodiment, when considered in connection with the accompanying drawings, in which.

DESCRIPTION

Figure 1:
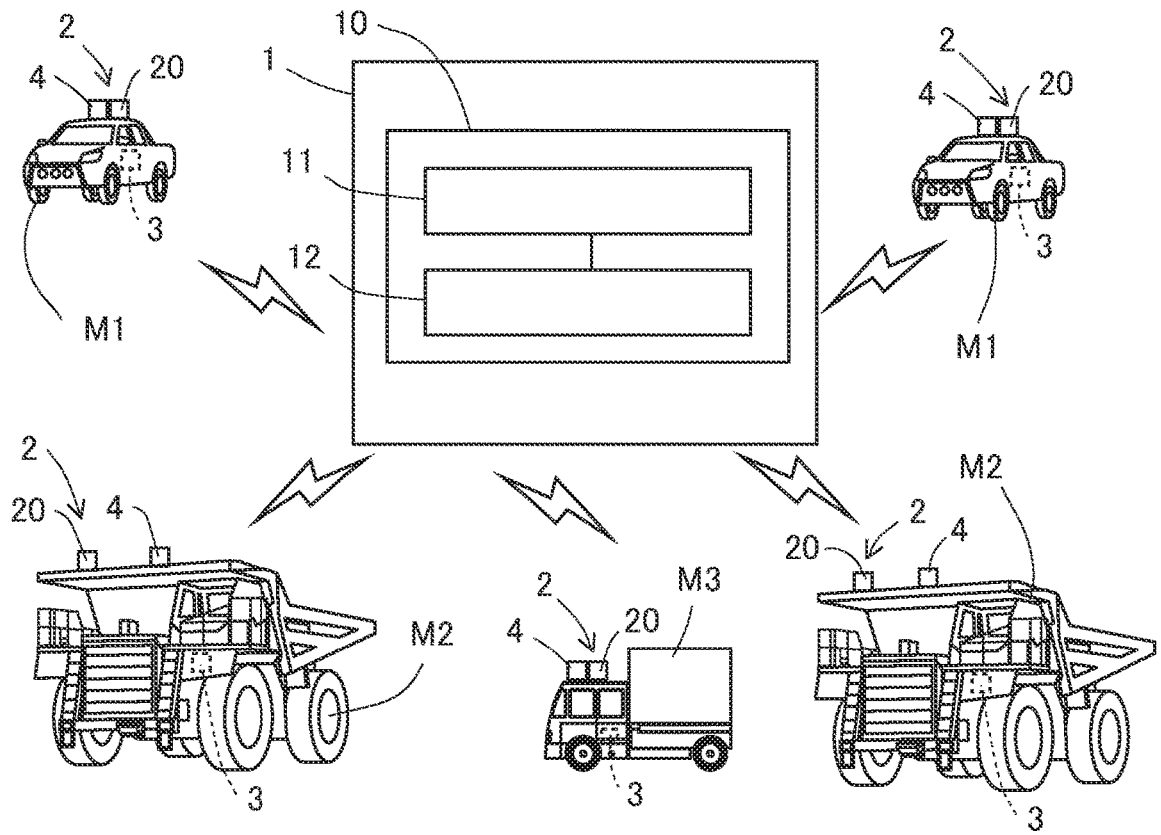
FIG. 1 is a view illustrating a configuration of an operation management system according to one embodiment of the present disclosure.

Referring to the drawings, there will be described below in detail an operation management system according to one embodiment of the present disclosure. It is to be understood that the present disclosure is not limited to the details of the following embodiment but may be changed and modified based on the knowledge of those skilled in the art. The operation management system 1 of the present embodiment is utilized in a mine that is a specific area that includes unpaved roads but does not include ordinary roads.

As illustrated in FIG. 1, the operation management system 1 is configured to manage operations of a plurality of registered mobilities, each of which is capable of obtaining positional information thereof, by sending a command as to a target route and a traveling speed. The operation management system 1 includes a computer 10 in which is stored specification information on a position of each tire of each registered mobility. It can be said that the operation management system 1 of the present embodiment is constituted by the computer 10. The registered mobility is a mobility registered beforehand in the computer 10 as a target to be managed. The mobility is a movable body (such as a vehicle) that travels on a road surface. Each registered mobility includes, for instance, a receiver 4 of a global navigation satellite system (GNSS) and an automated driving ECU 3 configured to execute an automated driving control.

In the present embodiment, a plurality of light vehicles M1, a plurality of large-sized dump trucks (large-sized heavy machines) M2, and at least one sprinkler vehicle M3 are registered each as the registered mobility. The light vehicle M1 is lighter in weight than the heavy machine. The light vehicle M1 is a pickup truck, for instance. The sprinkler vehicle M3 is provided with a tank in which water is stored. The sprinkler vehicle M3 is capable of sprinkling water behind itself by a pump. That is, the sprinkler vehicle M3 is a vehicle including a device for sprinkling water. Thus, the computer 10 manages operations of the plurality of registered mobilities including the mobilities different in kind or type. The computer 10 is communicable with each registered mobility. The operation management system 1 may be referred to as a central control system. The operation management system 1 is disposed in a facility that includes a wireless communication device.

The computer 10 includes at least one processor 11 and at least one memory 12. The processor 11 executes various kinds of processing according to programs stored in the memory 12. The memory 12 is a storage device. The memory 12 is disposed inside and/or outside the computer 10. It can be said that the computer 10 includes an electronic control unit (ECU). In the computer 10, the specification information on a position of each tire of each of the registered mobilities is stored. In the computer 10, a relative position of each tire with respect to the positional information of each registered mobility is stored, for instance. The computer 10 computes the position of each tire of the registered mobility based on the positional information and the specification information of the registered mobility.

In the computer 10, map data including positional information of a road is stored. The computer 10 computes the target route of each registered mobility based on the map data, a destination location of each registered mobility, and a location (current location) of each registered mobility. The computer 10, transmits, to each registered mobility, information about the target route and the traveling condition as a command (that may be referred to as an instruction signal). The traveling condition includes the traveling speed and a traveling interval (vehicle-to-vehicle distance). The computer 10 transmits, to the registered mobility for which automated driving is performed, a "normal command speed" as the command. The normal command speed is set as the traveling speed in automated driving. Based on the command received from the computer 10, the automated driving ECU 3 of each registered mobility executes an automated driving control with respect to a steering device, a drive device, and a brake device (each of which is not illustrated).

Each of the registered mobilities includes a road surface condition detecting device 2 configured to detect a road surface condition. The road surface condition detecting device 2 includes a surroundings monitoring device 20 configured to detect information on a surrounding object. The surroundings monitoring device 20 includes at least one of a camera, a light detection and ranging or laser imaging detection and ranging (LiDAR) device, and a radar. In the present embodiment, the surroundings monitoring device 20 is installed on each of the registered mobilities.

For instance, a plurality of cameras, one LiDAR device, and a plurality of millimeter-wave radars are installed as the surroundings monitoring device 20 on each light vehicle M1 in the present embodiment. The automated driving ECU 3 of each registered mobility can finely adjust the target route based on a detection result of the surroundings monitoring device 20 and the map data. For instance, the automated driving ECU 3 adjusts the target route so as to avoid an obstacle. It can be said that the surroundings monitoring device 20 is constituted so as to include a device that includes a recognition sensor such as the camera and/or that utilizes a time of flight (ToF) technique. The detection result of the road surface condition detecting device 2 of each registered mobility is transmitted as the road surface information to the computer 10, together with the positional information.

The computer 10 generates road surface map data such that a positon in the map data and the road surface information are associated with each other, based on the positional information and the road surface information obtained from at least one of the registered mobilities on which the road surface condition detecting device 2 is installed. This process may be referred to as a map generating process. The computer 10 stores the road surface map data and updates it every time. The computer 10 may obtain the road surface information to be utilized in generating the road surface map data from all the registered mobilities or from only part of the registered mobilities (e.g., the light vehicles).

The computer 10 obtains, from each sprinkler vehicle M3, water sprinkling information that is information on water sprinkling over the road surface by the sprinkler vehicle M3. The water sprinkling information includes operation information of the sprinkler vehicle M3 (such as the positional information) and work information of the sprinkler vehicle M3 (such as whether or not a water sprinkling work is performed and a width of a portion where water sprinkling is performed). The sprinkler vehicle M3 transmits the water sprinkling information to the computer 10 regardless of automated driving or manual driving. The automated driving ECU 3 installed on the sprinkler vehicle M3, for which automated driving is performed, executes the automated driving control based on the target route, the traveling speed, the traveling interval, and timing of water sprinkling, which are instructed by the computer 10.

The computer 10 computes a position where a puddle is formed, based on the road surface map data and the water sprinkling information. This process may be referred to as a puddle-position computing process. The computer 10 computes, as a puddle, an area where a position of a hollowed portion (such as a depression or a rut on the road surface), which can be grasped from the road surface map data, overlaps an area where water sprinkling was performed and that can be grasped from the water sprinkling information (hereinafter referred to as a "water-sprinkled area"). The computer 10 sets the water-sprinkled area based on the water sprinkling information. The computer 10 sets a position of the hollowed portion in the water-sprinkled area as a position where a puddle is formed (hereinafter referred to as a "puddle position"). The setting of the water-sprinkled area is canceled when a predetermined time elapses from a time of setting of the water-sprinkled area. The predetermined time is set based on a degree of drainage of the road surface, for instance.

The computer 10 designates (selects) a designation mobility from among a plurality of registered mobilities and modifies (sets) the target route of the designation mobility such that the tire of the designation mobility travels a puddle. This process may be referred to as a target route modifying process. The computer 10 selects the registered mobility that is scheduled to travel the water-sprinkled area or that is traveling the water-sprinkled area from among all the registered mobilities or from among predetermined registered mobilities, based on the positional information and the target route of each registered mobility. According to a predetermined designation rule, the computer 10 designates, as the designation mobility, at least one registered mobility that is to travel a puddle from among the selected at least one registered mobility.

Figure 2:
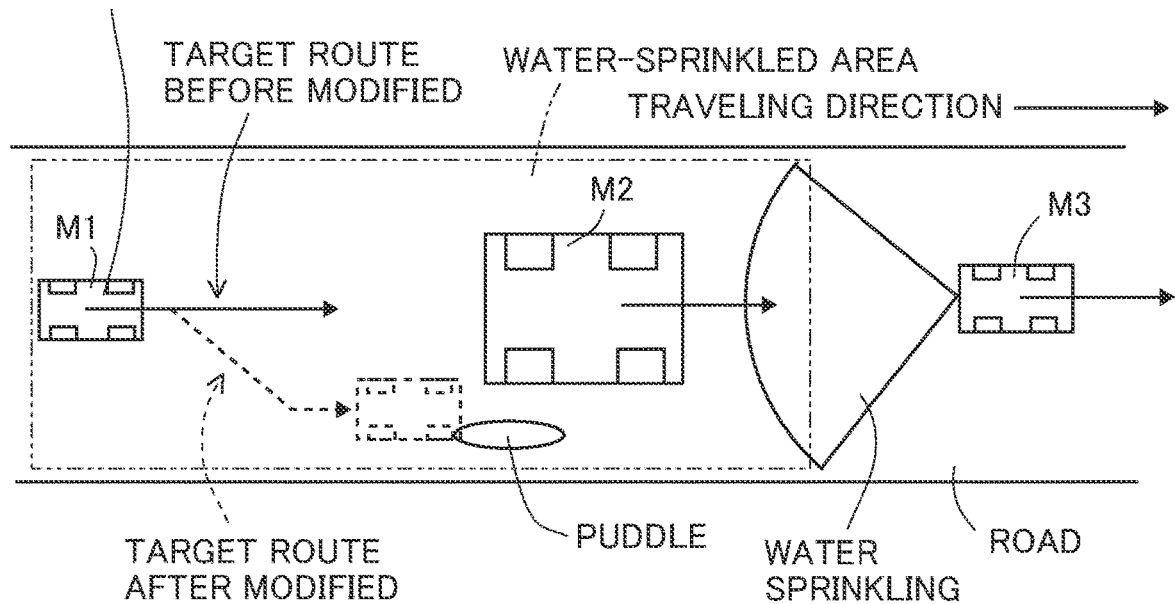
FIG. 2 is a conceptual view for explaining modification of a target route in the embodiment.

The designation rule for designating the designation mobility is set as follows. That is, "The designation mobility is a registered mobility that travels after the sprinkler vehicle M3." and "The designation mobility is a registered mobility that is lighter in weight than the large-sized heavy machines (i.e., the light vehicle M1 in the present embodiment). In a case where the large-sized dump truck M2 is traveling immediately after the sprinkler vehicle M3 that is performing the water sprinkling work, namely, the large-sized dump truck M2 is the first mobility following the sprinkler vehicle M3, and the light vehicle M1 is traveling immediately after the large-sized dump truck M2, the light vehicle M1, which is the second mobility following the sprinkler vehicle M3, is set as the designation mobility according to the designation rule, as illustrated in FIG. 2. In this case, the computer 10 may send a command as to a target route that is set so as to avoid the puddle to the large-sized dump truck M2 that is traveling immediately after the sprinkler vehicle M3. That is, in a case where there is the registered mobility that travels between the sprinkler vehicle M3 and the designation mobility, the computer 10 may send a command as to a target route that is modified so as to avoid the puddle to that registered mobility between the sprinkler vehicle M3 and the designation mobility. Further, the computer 10 may select at least one registered mobility that is scheduled to travel the water-sprinkled area or that is traveling the water-sprinkled area without using the designation rule and may send a command as to the target route that is modified so as to avoid the puddle to the registered mobility (that may be referred to as the designation mobility). For instance, the computer 10 may send a command as to the target route that is set so as to avoid the puddle to the large-sized dump truck M2 or the light vehicle M1 that is scheduled to travel the water-sprinkled area or that is traveling the water-sprinkled area. The computer 10 can send a command as to the target route that is set so as to pass or avoid the puddle to the designation mobility based on the position of the puddle. Thus, the computer 10 modifies the target route of the designation mobility based on the position of the puddle.

The computer 10 transmits, to the designation mobility, information on the traveling speed and the target route that is modified such that the tire passes the puddle. The computer 10 sends a command as to the modified target route to the designation mobility. Further, the computer 10 sets the traveling speed of the designation mobility to a specific speed, which is lower than a normal command speed that is the traveling speed in automated driving, such that the designation mobility passes the puddle at the specific speed, and sends a command as to the specific speed to the designation mobility (the normal command speed>the specific speed). The specific speed is set to a low speed (that is lower than or equal to a predetermined speed) so as to cause the designation mobility to travel the puddle more safely. The specific speed is set to a speed at which the behavior of the mobility does not become unstable even if skidding occurs. Thus, the computer 10 modifies the traveling speed of the designation mobility when the designation mobility travels the puddle so as to be equal to the specific speed lower than the traveling speed in automated driving and sends a command as to the specific speed as the traveling speed to the designation mobility.

For instance, the computer 10 may set the target route such that one designation mobility passes a plurality of puddles or such that a plurality of designation mobilities passes one or more puddles. For instance, the computer 10 may set the target route and the number of the designation mobilities such that an arrival time of each of the designation mobility and other registered mobilities to a destination location is on or before a permissible time. It is noted that the detection result of the surroundings monitoring device 20 installed on the designation mobility is also reflected in the road surface map data.

In a case where one or more designation mobilities have passed the same puddle a predetermined number of times, the computer 10 supposes that uneven distribution of water on the road surface due to the puddle is eliminated, so as to cancel (delete) the setting of the puddle positon. When the setting of all the puddle positions is canceled, the setting of the designation mobility is canceled. In this case, the target route and the traveling speed of the registered mobility, which was the designation mobility, are returned to the normal target route and the normal traveling speed.

Figure 3:
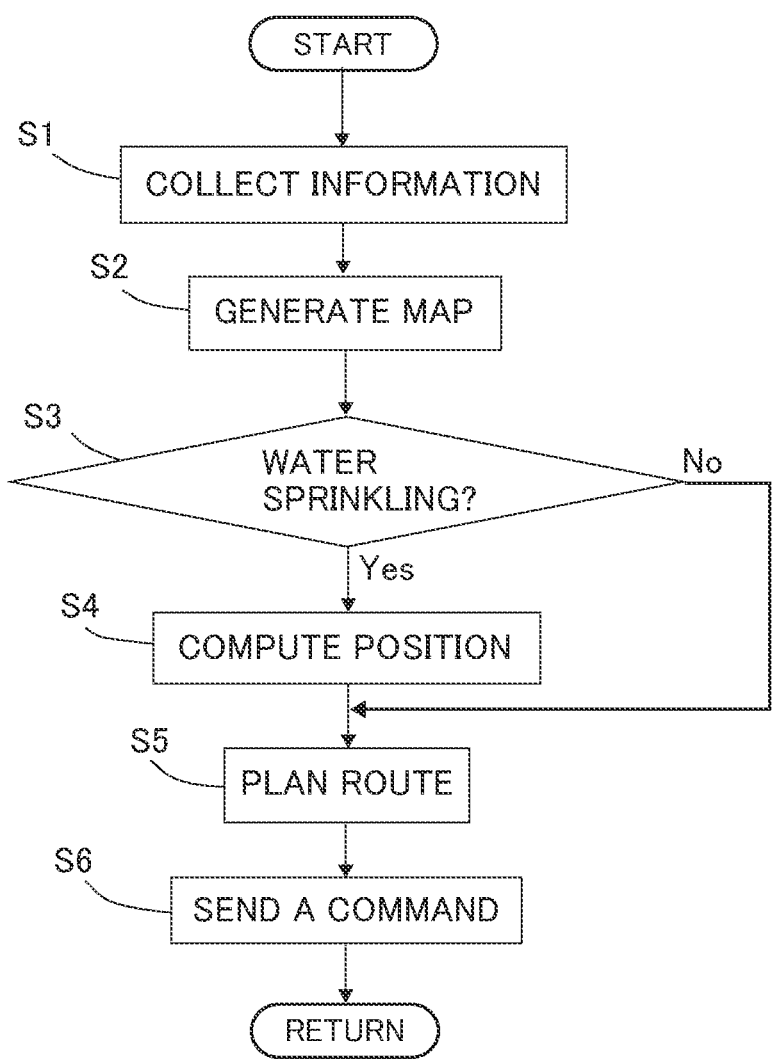
FIG. 3 is a flowchart illustrating one control example in the embodiment.

As illustrated in FIG. 3, the computer 10 obtains the road surface information and the water sprinkling information from each registered mobility (S1). The computer 10 generates the road surface map data based on the obtained road surface information (S2). The computer 10 determines whether the water sprinkling work is being performed based on the obtained water sprinkling information (S3). When the water sprinkling work is being performed (S3: Yes), the computer 10 computes the puddle position (S4). The computer 10 selects the designation mobility and modifies the target route and the traveling speed of the designation mobility (S5). The computer 10 modifies the target route and the traveling speed of each registered mobility other than the designation mobility as needed. The computer 10 sends a command as to the modified target route and traveling speed to the designation mobility, for instance (S6).

When the water sprinkling work is not being performed (S3: No), the computer 10 modifies the target route of each registered mobility based on the road surface map data as needed (S5). The computer 10 makes a plan about the target route and the traveling speed of each registered mobility based on the road surface map data and the water sprinkling information (S5). In the operation management system 1, such processing is repeated. Thus, the computer 10 executes the map generating process, the puddle-position computing process, and the target route modifying process.

According to the present embodiment, the target route of the designation mobility can be modified based on the position of the puddle. This suppresses a decrease in the work efficiency in mines. Further, the tire of the designation mobility passes the puddle, so that water in the puddle can be scattered from the puddle and dispersed over the road surface outside the puddle. That is, the operation management system 1 according to the present embodiment suppresses uneven distribution of water on the road surface. This prevents a difference in the road surface friction coefficient due to the puddle. The operation management system 1 according to the present embodiment suppresses uneven distribution of water on the unpaved road and makes the road surface friction coefficient appropriate.

When the present operation management system 1 is used in a mine, the specific area is the mine, and the plurality of registered mobilities includes, for instance, the heavy machine (such as the large-sized dump truck), the vehicle lighter in weight than the heavy machine (such as the light vehicle), and the sprinkler vehicle. In this case, the computer 10 sets at least one of the vehicles as the designation mobility, so that the water in the puddle can be dispersed while preventing a change in the road surface configuration.

Other Operating Conditions

In a case where there are a plurality of light vehicles (i.e., the registered mobilities that are relatively light in weight) that travels the water-sprinkled area so as to go to the destination location and there are two or more light vehicles whose loading weights are mutually different, the computer 10 may designate the light vehicle whose loading weight is the smallest as the designation mobility. If the light vehicle having a small weight travels the puddle, water over the road surface can be scattered while suppressing a change in the road surface configuration. In a case where there is, among the registered mobilities that travel following the sprinkler vehicle M3, a plurality of the vehicles whose destination location is the same as the destination location of the sprinkler vehicle M3, the computer 10 sets one of the plurality of the vehicles that has the smallest gross weight (including the loading weight) as the designation mobility.

The computer 10 may set the traveling speed to a speed lower than the specific speed for an area, in the water-sprinkled area, where the designation mobility will be probably damaged if skidding occurs when the designation mobility passes the puddle at the specific speed. (Such an area will be referred to as a risk area.) Alternatively, the computer 10 may set the target route such that the designation mobility avoids the puddle in the risk area. The risk area is set to an area where an obstacle is present around the puddle or an area where a cliff is present around the puddle.

The order of designation of the designation mobility may be set in accordance with a risk that is caused when the designation mobility comes into contact with an obstacle. For instance, the mobility of unmanned automated driving is selected as the designation mobility with higher priority than the mobility of manned automated driving. Further, the smaller the gross weight including the loading weight among the registered mobilities of unmanned automated driving or the registered mobilities of manned automated driving, the higher the priority in selection of the designation mobility. That is, in this designation rule, the registered mobility of unmanned automated driving with a light weight is designated as the designation mobility with higher priority. If the registered mobility carries no occupant and the registered mobility is light in weight, a risk of damage to a human and the mobility when the registered mobility contacts an obstacle due to an occurrence of skidding is reduced. Thus, the computer 10 sets, as the designation mobility, one of the plurality of vehicles among the registered mobilities that travel following the sprinkler vehicle M3, which one of the plurality of vehicles is unmanned and has the same destination location as the destination location of the sprinkler vehicle M3.

The computer 10 may set the puddle position in real time based on the detection result of the surroundings monitoring device 20 installed on the designation mobility and may modify the target route of the designation mobility. The computer 10 or the surroundings monitoring device 20 may determine the presence or absence of the puddle located ahead thereof based on image data of cameras and may determine the puddle position. The information on the puddle position in real time may be reflected in the road surface map data as the road surface information.

Others

The present disclosure is not limited to the details of the illustrated embodiment. For instance, the computer 10 may obtain the weather information of the specific area (such as a mine) via a network such as the Internet. The computer 10 computes the position where the puddle is formed based on the weather information and the road surface map data. In a case where the weather information indicates rainy, for instance, there is a high possibility that the puddle is formed in the hollowed portion of the road surface. The computer 10 may designate the designation mobility and may set the target route and the traveling speed of the designation mobility based on the puddle position after rain stops. This configuration also offers the same advantages as described above.

In the configuration described above, part of the flow of FIG. 3 is changed as follows, for instance. The computer 10 obtains the weather information in place of or in addition to the water sprinkling information (S1). The computer 10 determines whether weather of the specific area is rain in place of or in addition to checking whether the water sprinkling work is performed (S3). The computer 10 computes an area where it rained and computes the puddle position (S4). Other processing is similarly executed as described above. Thus, the puddle position may be set based on the weather information.

The computer 10 grasps beforehand the operation and the work area of the sprinkler vehicle M3. Accordingly, before the sprinkler vehicle M3 starts to work, the computer 10 may set the registered mobility that satisfies the condition of the designation mobility as the registered mobility that follows the sprinkler vehicle M3. Before the sprinkler vehicle M3 starts to work, the computer 10 may set a target position of a target light vehicle M1 to a position behind the sprinkler vehicle for enabling the light vehicle M1 with a small weight to be disposed so as to follow the sprinkler vehicle and may move the light vehicle M1 to that positon. In this configuration, the target light vehicle M1 is disposed as the designation mobility behind the sprinkler vehicle M3 before water sprinkling is performed by the sprinkler vehicle M3 (namely, before departure or during traveling of the sprinkler vehicle M3), so that water in the puddle can be dispersed at early timing after water sprinkling.

The road surface condition detecting device 2 may include a rut determination device in addition to or in place of the surroundings monitoring device 20. The rut determination device may be an ECU or a computer 10, for instance. The rut determination device determines the presence or absence of a rut based on a difference between "a reference value of a supply current to a steering motor that is set beforehand for a target steering angle" and "a detection value of a current sensor installed on the steering motor". The target steering angle is a steering angle as a target instructed by the automated driving ECU3 with respect to the steering device. The steering device supplies a control current based on a difference between the target steering angle and an actual steering angle to the steering motor that steers the steerable wheel. For instance, if the light vehicle turns when traveling along the rut, the control current larger than that when traveling on the road surface without a rut is necessary to drive over the rut. In a case where there is a rut on the road surface, the difference between the reference value of the supply current and the detection value of the current sensor is large. Accordingly, when the difference becomes greater than or equal to a predetermined threshold in turning of the own mobility, the rut determination device determines that there is a rut or the own mobility will drive over a rut. The road surface condition may be detected in this way.

The road surface condition detecting device 2 may include a behavior detecting sensor configured to detect the behavior of the vehicle. Examples of the behavior detecting sensor includes an acceleration sensor and a yaw rate sensor. In a case where an acceleration sensor configured to detect acceleration in the vertical direction is installed on the registered mobility, the computer 10 can determine the presence or absence of unevenness (protrusions and depressions) of the road surface based on the detection result of the acceleration sensor.

The computer 10 may designate the designation mobility, may modify the target route, and may modify the traveling speed, in consideration of the scale and the configuration of the unevenness of the road surface. In a case where a rut is set as the puddle position, for instance, the computer 10 may set the target route of the designation mobility such that the target route extends along a recess of the rut. This enables water in the rut to be efficiently scattered. Further, in a case where the registered mobility needs to drive over a large protrusion before reaching the puddle, the computer 10 may designate, as the designation mobility, the registered mobility having a relatively high running capability. The computer 10 can set the target route and the traveling speed in consideration of the configuration of the road surface, the scale of unevenness, the specifications of the mobility, and the loading weight, for instance.

The operation management system 1 may be constituted by a plurality of computers such that the plurality of computers exhibits the function of the computer 10 as a whole. The operation management system 1 is usable not only in mines but also at other sites. The limited area that includes the unpaved roads but does not include the ordinary roads is not limited to mines but may be construction sites such as engineering works and off-road race sites, for instance. The designation rule may be set to a rule that "The designation mobility is a registered mobility that is traveling immediately after the sprinkler vehicle M3. (The designation mobility is the first vehicle following the sprinkler vehicle M3.)". In this case, the designation mobility is the large-sized dump truck M2 in the example of FIG. 2. In a case where a plurality of puddle positons is set so as to be spaced apart in the road width direction at the same position in the traveling direction, the computer 10 may set a plurality of designation mobilities and may set the target route of each designation mobility such that one of the plurality of designation mobilities travels one of the plurality of puddles located at the same position in the traveling direction.

What is claimed is:

1. An operation management system configured to manage operations of a plurality of registered mobilities in a limited specific area that includes unpaved roads but does not include ordinary roads, by sending a command as to a target route and a traveling speed to each of the registered mobilities, which is capable of obtaining positional information thereof,
    wherein the operation management system includes a computer configured to:
        generate a road surface map data such that a position in map data and road surface information are associated with each other, based on the positional information and the road surface information obtained from at least one of the registered mobilities on which a road surface condition detecting device configured to detect a road surface condition is installed;
        compute a positon where a puddle is formed, based on i) one of water sprinkling information that is information on water sprinkling over a road surface by a sprinkler vehicle or weather information of the specific area and ii) the road surface map data;
        designate a designation mobility from among the plurality of registered mobilities and modify the target route of the designation mobility based on the position of the puddle; and
        send a command as to the modified target route to the designation mobility.

2. The operation management system according to claim 1,
    wherein specification information on a position of a tire of each of the registered mobilities is stored in the computer, and
    wherein the computer modifies the target route of the designation mobility such that the tire of the designation mobility passes the puddle.

3. The operation management system according to claim 2, wherein the computer modifies a traveling speed of the designation mobility when traveling the puddle so as to be equal to a specific speed that is lower than the traveling speed in automated driving and sends, as the traveling speed, a command as to the specific speed to the designation mobility.

4. The operation management system according to claim 2,
    wherein the specific area is a mine,
    wherein the plurality of registered mobilities includes a heavy machine, a vehicle that is light in weight than the heavy machine, and the sprinkler vehicle, and
    wherein the computer sets, as the designation mobility, at least one vehicle each as the vehicle.

5. The operation management system according to claim 4, wherein, where there is, among the registered mobilities that travel following the sprinkler vehicle, a plurality of the vehicles whose destination location is the same as a destination location of the sprinkler vehicle, the computer sets one of the plurality of the vehicles that has the smallest gross weight as the designation mobility.

6. The operation management system according to claim 4, wherein the computer sets, as the designation mobility, one of the plurality of the vehicles among the registered mobilities that travel following the sprinkler vehicle, which one of the plurality of the vehicles is unmanned and has the same destination location as a destination location of the sprinkler vehicle.

* * * * *